United States Patent
Sutaria

(10) Patent No.: US 12,504,449 B1
(45) Date of Patent: Dec. 23, 2025

(54) SUPPLY VOLTAGE DROOP DETECTOR

(71) Applicant: Synopsys, Inc., Sunnyvale, CA (US)

(72) Inventor: Ketul Bhogilal Sutaria, Austin, TX (US)

(73) Assignee: Synopsys, Inc., Sunnyvale, CA (US)

( * ) Notice: Subject to any disclaimer, the term of this patent is extended or adjusted under 35 U.S.C. 154(b) by 160 days.

(21) Appl. No.: 18/419,435

(22) Filed: Jan. 22, 2024

(51) Int. Cl.
*G01R 19/165* (2006.01)

(52) U.S. Cl.
CPC .............. *G01R 19/16552* (2013.01)

(58) Field of Classification Search
CPC ...... H02J 3/18; H02J 13/00; H02J 3/24; H02J 3/28; H02J 7/2434; G06F 1/305; G06F 1/3206; G06F 1/3243; G06F 11/3058; G06F 11/1608; G06F 11/2215; G06F 11/0793; G06F 1/266; G06F 11/0721; G06F 1/14; G01R 31/50; G01R 31/52; G01R 19/0092; G01R 19/165; G01R 31/2879; G01R 19/0084; G01R 19/16528; G01R 19/25; G01R 19/003; G01R 25/04; G01R 29/18; G01R 31/00; G01R 31/31708; G01R 31/3177
See application file for complete search history.

(56) References Cited

U.S. PATENT DOCUMENTS

| | | | |
|---|---|---|---|
| 7,528,619 B2 * | 5/2009 | Paillet | H03K 19/00346 326/28 |
| 11,402,413 B1 * | 8/2022 | Mohan | G06F 1/3296 |
| 12,057,844 B2 * | 8/2024 | Lee | H03K 5/135 |
| 12,306,228 B1 * | 5/2025 | Knoll | H03L 7/00 |

* cited by examiner

*Primary Examiner* — Vinh P Nguyen
(74) *Attorney, Agent, or Firm* — Weaver Austin Villeneuve & Sampson LLP

(57) ABSTRACT

A droop detector includes a phase generator generating a pulse responsive to a clock signal; an edge detector generating a first signal in response to the pulse; and a time-to-digital converter that includes N time-to-digital converter units. The time-to-digital converter generates an N-bit value representative of the timing difference between the edge of the pulse and the first signal. A capacitance associated with a subset of the time-to-digital converter units is adjusted during a calibration time to cause the difference between the arrival times of the data and clock at the $j^{th}$ time-to-digital converter unit to be greater than the difference between arrival times of the data and clock at the $(j+1)^{th}$ time-to-digital convert unit. The data terminal of the flip-flop of each time-to-digital converter unit is responsive to the first pulse, and the clock terminal of the flip-flop of each time-to-digital converter unit is responsive to the first signal.

20 Claims, 11 Drawing Sheets

| | Bit<1> | Bit<2> | ... | ... | ... | ... | ... | ... | Bit<10> |
|---|---|---|---|---|---|---|---|---|---|
| TDC<P10> | 1 | 1 | 1 | 1 | 1 | 1 | 0 | 0 | 0 |
| TDC<P9> | 1 | 1 | 1 | 1 | 1 | 1 | 0 | 0 | 0 |
| TDC<P8> | 1 | 1 | 1 | 1 | 1 | 1 | 0 | 0 | 0 |
| TDC<P7> | 1 | 1 | 1 | 1 | 1 | 1 | 0 | 0 | 0 |
| TDC<P6> | 1 | 1 | 1 | 1 | 1 | 1 | 0 | 0 | 0 |
| TDC<P5> | 1 | 1 | 1 | 1 | 1 | 1 | 0 | 0 | 0 |
| TDC<P4> | 1 | 1 | 1 | 1 | 1 | 1 | 0 | 0 | 0 |
| TDC<P3> | 1 | 1 | 1 | 1 | 1 | | 0 | 0 | 0 |
| TDC<P2> | 1 | 1 | 1 | 1 | | | | 0 | 0 |
| TDC<P1> | 1 | 1 | | | | | | | 0 |

|  | Bit<0> | Bit<1> | Bit<2> | Bit<3> | Bit<4> | Bit<5> | Bit<6> | Bit<7> | Bit<8> | Bit<9> |
|---|---|---|---|---|---|---|---|---|---|---|
| TDC<P10> | 1 | 1 | 1 | 1 | 1 | 1 | 0 | 0 | 0 | 0 |
| TDC<P9> | 1 | 1 | 1 | 1 | 1 | 1 | 0 | 0 | 0 | 0 |
| TDC<P8> | 1 | 1 | 1 | 1 | 1 | 1 | 0 | 0 | 0 | 0 |
| TDC<P7> | 1 | 1 | 1 | 1 | 1 | 1 | 0 | 0 | 0 | 0 |
| TDC<P6> | 1 | 1 | 1 | 1 | 1 | 1 | 0 | 0 | 0 | 0 |
| TDC<P5> | 1 | 1 | 1 | 1 | 1 | 1 | 0 | 0 | 0 | 0 |
| TDC<P4> | 1 | 1 | 1 | 1 | 1 | 1 | 0 | 0 | 0 | 0 |
| TDC<P3> | 1 | 1 | 1 | 1 | 1 | 1 | 1 | 1 | 0 | 0 |
| TDC<P2> | 1 | 1 | 1 | 1 | 1 | 1 | 0 | 0 | 0 | 0 |
| TDC<P1> | 1 | 1 | 1 | 1 | 1 | 1 | 0 | 0 | 0 | 0 |

610 → TDC<P3>

FIG. 6B

|  | Bit<0> | Bit<1> | Bit<2> | Bit<3> | Bit<4> | Bit<5> | Bit<6> | Bit<7> | Bit<8> | Bit<9> |
|---|---|---|---|---|---|---|---|---|---|---|
| TDC<P10> | 1 | 1 | 1 | 1 | 1 | 1 | 0 | 0 | 0 | 0 |
| TDC<P9> | 1 | 1 | 1 | 1 | 1 | 1 | 0 | 0 | 0 | 0 |
| TDC<P8> | 1 | 1 | 1 | 1 | 1 | 1 | 0 | 0 | 0 | 0 |
| TDC<P7> | 1 | 1 | 1 | 1 | 1 | 1 | 0 | 0 | 0 | 0 |
| TDC<P6> | 1 | 1 | 1 | 1 | 1 | 1 | 0 | 0 | 0 | 0 |
| TDC<P5> | 1 | 1 | 1 | 1 | 1 | 1 | 0 | 0 | 0 | 0 |
| TDC<P4> | 1 | 1 | 1 | 1 | 1 | 1 | 0 | 0 | 0 | 0 |
| TDC<P3> | 1 | 1 | 1 | 1 | 1 | 1 | 1 | 1 | 1 | 1 |
| TDC<P2> | 1 | 1 | 1 | 1 | 1 | 1 | 0 | 0 | 0 | 0 |
| TDC<P1> | 1 | 1 | 1 | 1 | 1 | 1 | 0 | 0 | 0 | 0 |

620 → TDC<P3>

FIG. 6C

|            | Bit<0> | Bit<1> | Bit<2> | Bit<3> | Bit<4> | Bit<5> | Bit<6> | Bit<7> | Bit<8> | Bit<9> |
|------------|--------|--------|--------|--------|--------|--------|--------|--------|--------|--------|
| TDC<P10>   | 1      | 1      | 1      | 1      | 1      | 1      | 0      | 0      | 0      | 0      |
| TDC<P9>    | 1      | 1      | 1      | 1      | 1      | 1      | 0      | 0      | 0      | 0      |
| TDC<P8>    | 1      | 1      | 1      | 1      | 1      | 1      | 0      | 0      | 0      | 0      |
| TDC<P7>    | 1      | 1      | 1      | 1      | 1      | 1      | 0      | 0      | 0      | 0      |
| TDC<P6>    | 1      | 1      | 1      | 1      | 1      | 1      | 0      | 0      | 0      | 0      |
| 730 → TDC<P5> | 1   | 1      | 1      | 1      | 1      | 1      | 1      | 1      | 0      | 0      |
| 720 → TDC<P4> | 1   | 1      | 1      | 1      | 1      | 1      | 1      | 1      | 0      | 0      |
| 710 → TDC<P3> | 1   | 1      | 1      | 1      | 1      | 1      | 1      | 1      | 0      | 0      |
| TDC<P2>    | 1      | 1      | 1      | 1      | 1      | 1      | 0      | 0      | 0      | 0      |
| TDC<P1>    | 1      | 1      | 1      | 1      | 1      | 1      | 0      | 0      | 0      | 0      |

*FIG. 7B*

|            | Bit<0> | Bit<1> | Bit<2> | Bit<3> | Bit<4> | Bit<5> | Bit<6> | Bit<7> | Bit<8> | Bit<9> |
|------------|--------|--------|--------|--------|--------|--------|--------|--------|--------|--------|
| TDC<P10>   | 1      | 1      | 1      | 1      | 1      | 1      | 0      | 0      | 0      | 0      |
| TDC<P9>    | 1      | 1      | 1      | 1      | 1      | 1      | 0      | 0      | 0      | 0      |
| TDC<P8>    | 1      | 1      | 1      | 1      | 1      | 1      | 0      | 0      | 0      | 0      |
| TDC<P7>    | 1      | 1      | 1      | 1      | 1      | 1      | 0      | 0      | 0      | 0      |
| TDC<P6>    | 1      | 1      | 1      | 1      | 1      | 1      | 0      | 0      | 0      | 0      |
| 760 → TDC<P5> | 1   | 1      | 1      | 1      | 1      | 1      | 1      | 1      | 0      | 0      |
| 750 → TDC<P4> | 1   | 1      | 1      | 1      | 1      | 1      | 1      | 1      | 1      | 1      |
| 740 → TDC<P3> | 1   | 1      | 1      | 1      | 1      | 1      | 1      | 1      | 1      | 1      |
| TDC<P2>    | 1      | 1      | 1      | 1      | 1      | 1      | 0      | 0      | 0      | 0      |
| TDC<P1>    | 1      | 1      | 1      | 1      | 1      | 1      | 0      | 0      | 0      | 0      |

*FIG. 7C*

SUPPLY VOLTAGE DROOP DETECTOR

TECHNICAL FIELD

The present application relates to high-resolution monitoring of the supply voltage in an integrated circuit, and more particularly to high resolution detection of the droop in magnitude and duration of the supply voltage powering an integrated circuit.

BACKGROUND

A semiconductor integrated circuit (IC) may fail to meet specified timing requirements, or operate at a target frequency if the supply voltage drops below a threshold level. To avoid such failures, ICs are typically designed with a tolerance level for the supply voltage. For example, if under a typical condition, the supply voltage has a value of 0.75 volts, the IC is designed to meet the specified target requirements even if the supply voltage drops by 10 percent to a value of 0.675 volts, thus leading to inefficiencies and suboptimal design.

SUMMARY

A droop detector, in accordance with one embodiment of the present disclosure, includes, in part: a first phase generator adapted to generate a first pulse in response to a clock signal, the first pulse having a first edge and a second edge occurring after the first edge; a first edge detector adapted to generate a first signal in response to the second edge of the first pulse, the first signal having a same direction as the first edge of the first pulse; and a first N-bit time-to-digital converter comprising N time-to-digital converter units. The first N-bit time-to-digital converter adapted to generate an N-bit value representative of the timing difference between the first edge of the first pulse and the first signal. Each time-to-digital converter unit includes, in part, a flip-flop. A capacitance associated with at least a subset of the N time-to-digital converter units is adjusted during a calibration time so that a difference between the arrival times of respective data and clock at the flip-flop disposed in $j^{th}$ time-to-digital converter unit is greater than a difference between arrival times of respective data and clock at the flip-flop disposed in $(j+1)^{th}$ time-to-digital convert unit, wherein j is an index ranging from 1 to N, and wherein N is an integer greater than one. The data terminal of the flip-flop disposed in each time-to-digital converter unit is responsive to the first edge of the first pulse, and the clock terminal of the flip-flop disposed in each time-to-digital converter unit is responsive to the first signal.

In one embodiment, the direction is the rising edge of the first pulse. In one embodiment, each of the subset of the N time-to-digital converter units further comprises a first externally controllable logic gate disposed along a path of the data of the flip-flop disposed in the time-to-digital converter unit, and a second externally controllable logic gate disposed along a path of the clock of the flip-flop disposed in the time-to-digital converter unit.

In one embodiment, the first and second externally controllable logic gates of each of the subset of the N time-to-digital converter units are controlled during the calibration time to change the miller capacitances of the first and second externally controllable logic gates. During the calibration time, the output of each of M of the N flip-flops of the time to-digital converter units is set to a first logic level, and the output of each of (N–M) of the flip-flops of the time-to-digital converter units is set to a second logic level. In one embodiment, the first and second externally controllable logic gates of each of the subset of the N time-to-digital converter units are NAND gates. In one embodiment, the first edge detector includes, in part, a negative-edge triggered flip-flop.

In one embodiment, the miller capacitances associated with the $j^{th}$ time-to-digital converter unit are caused to provide a same capacitive loading as the miller capacitances associated with the $(j+1)^{th}$ time-to-digital converter unit. In one embodiment, the first phase generator includes, in part, a first inverter receiving the clock signal; and a first XOR gate having a first terminal receiving the clock signal, and a second input terminal receiving an output of the first inverter. In one embodiment, in response to a droop in the supply voltage, the outputs of a subset of the (N–M) flip-flops change states representative of the magnitude of the droop.

In one embodiment, the droop detector further includes, in part: K phase generators each receiving a different delayed replica of the clock signal, and generating an associated pulse in response, the pulse generated by each of the K phase generators having a third edge that has the same direction as the first edge of the first pulse, and a fourth edge occurring after the third edge, wherein K is an integer greater than 1. The droop detector further includes, in part, K edge detectors, each associated with a different one of the K phase generators and each adapted to generate a third signal in response to the fourth edge of the pulse generated by the associated phase generator, wherein the third signal of each of the K edge detectors has a same direction as the first edge of the first pulse. The droop detector further includes, in part, K N-bit time-to-digital converters each associated with a different one of the K phase generators and a different one of the K edge detectors. Each of the K time-to-digital converters includes, in part, N time-to-digital converter units, each of the K time-to-digital converters is adapted to generate an N-bit value representative of the timing difference between the associated third edge of the pulse and the associated third signal. Each time-to-digital converter unit of each of the K time-to-digital converters includes, in part, a flip-flop, wherein a capacitance associated with at least a subset of the time-to-digital convert units of each of the K time-to-digital converters is adjusted during a calibration time so that a difference between the arrival times of data and clock at the flip-flop disposed in $j^{th}$ time-to-digital converter unit of each of the K time-to-digital converters is greater than the difference between arrival times of data and the clock at the flip-flop disposed in $(j+1)^{th}$ time-to-digital convert unit of each of the K time-to-digital converters. The data terminal of the flip-flop disposed in each time-to-digital converter unit of each K time-to-digital converters is responsive to the associated third edge of the first pulse, and the clock terminal of the flip-flop disposed in each time-to-digital converter unit of each K time-to-digital converters is responsive to the associated third signal.

In one embodiment, each of the subset of the time-to-digital converter units of each K time-to-digital converters further includes, in part, a first externally controllable logic gate disposed along a path of the data of the flip-flop disposed in the time-to-digital converter unit, and a second externally controllable logic gate disposed along a path of the clock of the flip-flop disposed in the time-to-digital converter unit. In one embodiment, the first and second externally controllable logic gates of each of the subset of the time-to-digital converter units of each K time-to-digital converters are controlled during the calibration time to change the miller capacitances of the first and second externally controllable logic gates. An output of each of M of the N flip-flops of each of the K time-to-digital converters is set to a first logic level, and an output of each of the (N−M) of the flip-flops of the K time-to-digital converters is set to a second logic level. In one embodiment, in response to the duration of a droop in the supply voltage, the output of each of a subset of (N−M) flip-flops in at least one the K time-to-digital converters of changes state representative of the duration of the droop.

A method of detecting droop in a supply voltage, in accordance with one embodiment of the present disclosure, includes in part: generating a first pulse in response to a clock signal, the first pulse having a first edge and a second edge occurring after the first edge; generating a first signal in response to the second edge of the first pulse, the first signal having a same direction as the first edge of the first pulse; and generating an N-bit value representative of the timing difference between the first edge of the first pulse and the first signal by an N-bit time-to-digital converter that includes, in part, N time-to-digital converter units. Each time-to-digital converter unit includes, in part, a flip-flop. A capacitance associated with at least a subset of the N time-to-digital converter units is adjusted during a calibration time so that a difference between arrival times of data and clock at the flip-flop disposed in $j^{th}$ time-to-digital converter unit is greater than a difference between arrival times of data and clock at the flip-flop disposed in $(j+1)^{th}$ time-to-digital convert unit, wherein j is an index ranging from 1 to N, and wherein N is an integer greater than one. The data terminal of the flip-flop disposed in each time-to-digital converter unit is responsive to the first edge of the first pulse, and the clock terminal of the flip-flop disposed in each time-to-digital converter unit is responsive to the first signal.

In one embodiment of the method, each of the subset of the N time-to-digital converter units further includes, in part, a first externally controllable logic gate disposed along a path of the data of the flip-flop disposed in the time-to-digital converter unit, and a second externally controllable logic gate disposed along a path of the clock of the flip-flop disposed in the time-to-digital converter unit. In one embodiment of the method, the first and second externally controllable logic gates of each of the subset of the N time-to-digital converter units are controlled during the calibration time to change the miller capacitances of the first and second externally controllable logic gates. During the calibration time, an output of each of M of the N flip-flops of the time to-digital converter is set to a first logic level, and an output of each of (N−M) of the flip-flops of the time to-digital converter is set to a second logic level.

In one embodiment of the method, the miller capacitances associated with the $j^{th}$ time-to-digital converter unit are caused to provide the same capacitive loading as the miller capacitances associated with the $(j+1)^{th}$ time-to-digital converter unit. In one embodiment, the method further includes, in part, detecting a droop in a supply voltage by identifying changes in the outputs of at least a subset of the (N−M) flip-flops. In one embodiment, the method further includes, in part: receiving, by each of K phase generators, a different delayed replica of the clock signal, and generating an associated pulse in response, the pulse generated by each of the K phase generators having a third edge that has the same direction as the first edge of the first pulse, and a fourth edge occurring after the third edge, wherein K is an integer greater than 1; generating, by each of K edge detectors each associated with a different one of the K phase generators, a third signal in response to the fourth edge of the pulse generated by the associated phase generator, wherein the third signal of each of K edge detector has a same direction as the first edge of the first pulse; and generating, by each of K N-bit time-to-digital converters each associated with a different one of the K phase generators and a different one of the K edge detectors, an N-bit value representative of the timing difference between the associated third edge of the pulse and the associated third signal. Each of the K time-to-digital converters includes, in part, N time-to-digital converter units, wherein each time-digital converter unit of each of the K time-to-digital converters includes, in part, a flip-flop. A capacitance associated with at least a subset of the N time-to-digital convert units of each of the K time-to-digital converters is adjusted during a calibration time so that a difference between the arrival times of data and clock at the flip-flop disposed in $j^{th}$ time-to-digital converter unit of each of the K time-to-digital converters is greater than a difference between arrival times of data and the clock at the flip-flop disposed in $(j+1)^{th}$ time-to-digital convert unit of each of the K time-to-digital converters. The data terminal of the flip-flops disposed in each time-to-digital converter unit of each K time-to-digital converters is responsive to the associated third edge of the first pulse, and the clock terminal of the flip-flop disposed in each time-to-digital converter unit of each K time-to-digital converters is responsive to the associated third signal.

A non-transitory computer readable medium includes, in part, stored instructions, which when executed by a processor, cause the one or more processors to generate data representative of a droop detector. The droop detector includes, in part: a first phase generator adapted to generate a first pulse in response to a clock signal, the first pulse having a first edge and a second edge occurring after the first edge; a first edge detector adapted to generate a first signal in response to the second edge of the first pulse, the first signal having a same direction as the first edge of the first pulse; and a first N-bit time-to-digital converter that includes, in part, N time-to-digital converter units. The first N-bit time-to-digital converter is adapted to generate an N-bit value representative of the timing difference between the first edge of the first pulse and the first signal. Each time-digital converter unit includes, in part, a flip-flop. The capacitance associated with at least a subset of the time-to-digital converter units is adjusted during a calibration time so that a difference between the arrival times of data and clock at the flip-flop disposed in $j^{th}$ time-to-digital converter unit is greater than a difference between the arrival times of data and clock at the flip-flop disposed in $(j+1)^{th}$ time-to-digital convert unit, wherein j is an index ranging from 1 to N, and wherein N is an integer greater than one. The data terminal of the flip-flop disposed in each time-to-digital converter unit is responsive to the first edge of the first pulse, and the clock terminal of the flip-flop disposed in each time-to-digital converter unit is responsive to the first signal.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 6B is a table showing the bit patterns of different chains in the droop magnitude and duration detector circuit of FIG. 4 in response to the first droop in the supply voltage of FIG. 6A, in accordance with one exemplary embodiment of the present disclosure.

FIG. 6C is a table showing the bit patterns of different chains in the droop magnitude and duration detector circuit of FIG. 4 in response to the second droop in the supply voltage of FIG. 6A, in accordance with one exemplary embodiment of the present disclosure.

FIG. 7B is a table showing the bit patterns of different chains in the droop magnitude and duration detector circuit of FIG. 4 in response to the first droop in the supply voltage of FIG. 6A, in accordance with one exemplary embodiment of the present disclosure.

FIG. 7C is a table showing the bit patterns of different chains in the droop magnitude and duration detector circuit of FIG. 4 in response to the second droop in the supply voltage of FIG. 7A, in accordance with one exemplary embodiment of the present disclosure.

DETAILED DESCRIPTION

Aspects of the present disclosure relate to detecting the supply voltage droop in a circuit design. Integrated circuits (IC) are typically designed to account for statistical variations that may occur in fabrication process, supply voltage and temperature (PVT). If not compensated for, supply voltage droop, as well as variations during the fabrication process or temperature conditions, may result in failures in the critical timing paths and functionality of the IC.

An IC may be designed to meet the timing and functionality requirements under worst PVT conditions. For example, an IC that under normal operating conditions is powered by a supply voltage $V_{DD}$, may be designed with a guard band of 10% so that if $V_{DD}$ drops by 10%, the IC can continue to operate as intended. However, an IC designed to operate under a worst case supply voltage may not have optimum performance when the supply voltage returns to its nominal value.

A supply voltage droop detector (hereinafter alternatively referred to as droop detector), in accordance with embodiments of the present disclosure, enables both the magnitude and duration of the droop to be detected relatively quickly and with a high resolution. Accordingly, for example, during dynamic voltage and frequency scaling (DVFS), the droop detector enables corrective action, such as clock stretching, phase change, or charge injection, to be taken relatively quickly in order to return the supply voltage to its nominal value.

A droop detector, in accordance with one embodiment of the present disclosure, includes, in part, a multitude of N-bit time-to-digital converters TDC[1:N] and is adapted to monitor the supply voltage multiple times during each clock cycle. In one embodiment, the TDCs achieve high timing resolution by using the miller capacitance. The droop detector is asynchronous and is therefore immune to potential timing failures.

Figure 1:
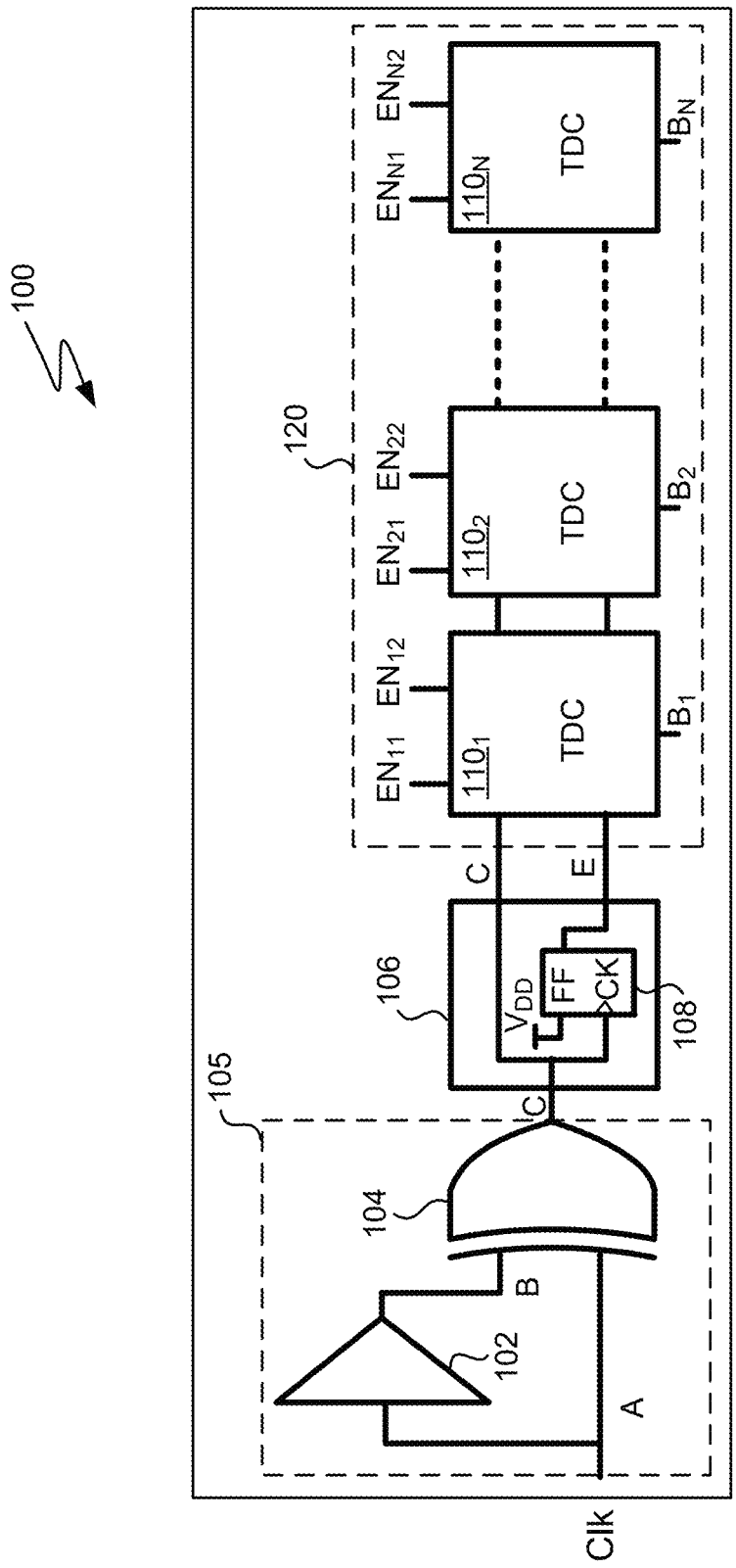
FIG. 1 is a schematic diagram of a supply voltage droop magnitude detector circuit, in accordance with one exemplary embodiment of the present disclosure.

FIG. 1 is a schematic diagram of a droop magnitude detector 100, in accordance with one embodiment of the present disclosure. Droop magnitude detector 100 is shown as including, in part, a phase generator (alternatively referred to herein as one-shot pulse generator) 105, an edge detector 106, and an N-bit time-to-digital converter (TDC) block 120. TDC block (alternatively referred to herein as TDC chain) 120 is shown as including N TDC units $110_1$, $110_2$ ... $100_N$ each corresponding to a different bit of TDC block 120. For example, TDC unit $110_1$ corresponds to the first bit of TDC block 120, and TDC unit $110_N$ corresponds to the $N^{th}$ bit of TDC block 120.

Phase generator 105 is shown as including a buffer 102 and an XOR gate 104. Clock signal Clk is applied to node A which is connected to the input of buffer 102 as well as to one of the inputs of XOR gate 104. Buffer 102 causes the signal at node A to arrive at the output terminal of buffer 102, namely node B, after a certain time delay. Accordingly, XOR gate 104 which receives the signals at nodes A and B, generates a pulse having a width that is proportional to the supply voltage $V_{DD}$. Therefore, the larger is the droop in the $V_{DD}$, the wider will be the pulse generated by pulse generator 105.

The output of XOR gate 104 at node C is applied (i) to a first terminal of the TDC unit $110_1$ forming bit 1 of TDC block 120, and (ii) to a clock terminal of the negative edge-triggered flip-flop 108. The data terminal of flip-flop 108 is connected to the supply voltage $V_{DD}$. Accordingly, in response to a falling edge of the pulse generated by phase generator 105, flip-flop 108 generates a rising edge (i.e., rising direction) signal at node E, which is connected to the second terminal of TDC unit $110_1$. In response, TDC unit $110_1$ generates an output signal $B_1$, which together with other output bits $B_2$, $B_3$ ... $B_N$ of TDC block 120, as described further below, represent the magnitude of the droop in supply voltage $V_{DD}$. Each TDC unit $110_j$, except TDC unit $110_N$, generates a pair of output signals that is delivered to TDC unit $110_{j+1}$, where j is an index ranging from 1 to N in this example.

Figure 2:
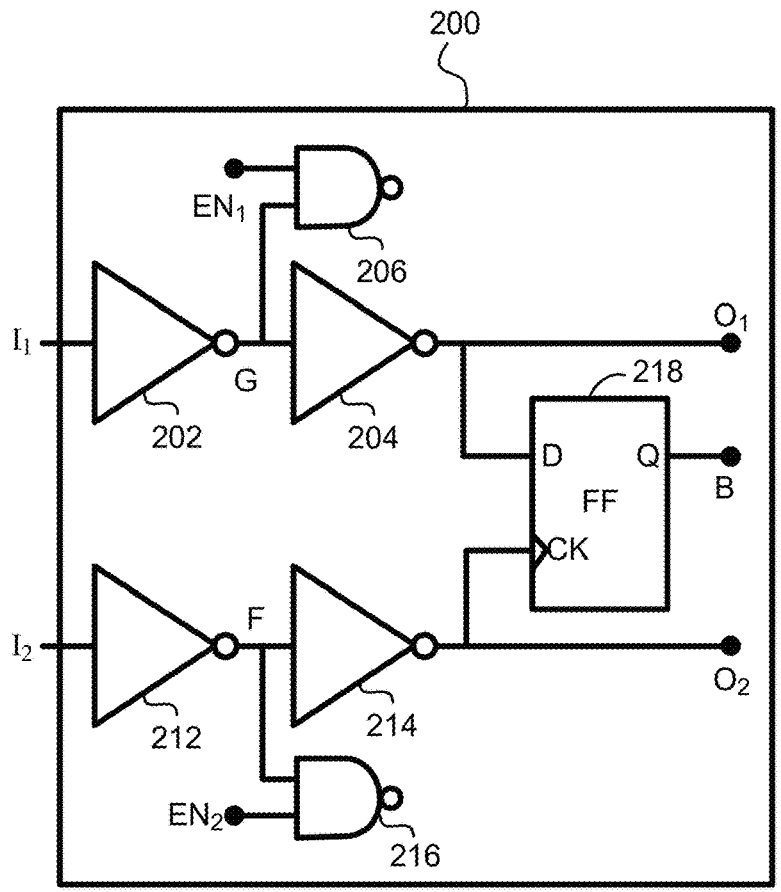
FIG. 2 is a schematic diagram of the time-to-digital converter used in the supply voltage droop magnitude detector circuit of FIG. 1, in accordance with one exemplary embodiment of the present disclosure.

FIG. 2 is a schematic diagram of a TDC unit 200, representing an example of the implementation of TDC unit $110_j$ of FIG. 1. TDC unit 200 is shown as including, in part, inverters 202, 204, 212, 214, NAND gates 206, 216 and flip-flop 218. Inverters 202 and 204 delay the received input signal $I_1$ and apply the delayed signal to the data terminal D of flip-flop 218. Inverters 212 and 214 delay the received input signal $I_2$ and apply the delayed signal to the clock terminal CK of flip-flop 218. Therefore, the signals applied to the data and clock terminals of flip-flop 218 are shifted in time by the same amount relative to the input signals $I_1$ and $I_2$.

Referring to FIGS. 1 and 2 concurrently, the output of flip-flop 218 at node B represents an output of TDC unit $110_j$ of FIG. 1 and thus corresponds to any of the output $B_1$, $B_2$, $B_3$ . . . $B_N$ of TDC chain 120. Outputs $O_1$ and $O_2$ of TDC unit 200, generated respectively by inverters 204 and 214, are applied to the input of the next immediate TDC unit in TDC chain 120, as shown in FIG. 1. In other words, outputs $O_1$ and $O_2$ of TDC unit $110_j$ are received as input signals $I_1$ and $I_2$ of TDC unit $110_{j+1}$ of TDC chain 120.

Because the rising edge of the pulse generated by phase generator 105 at node C arrives before the rising edge of signal E generated by flip-flop 108 of FIG. 1, the signal at the data terminal D of flip-flop 218 of FIG. 2 arrives before the signal at clock terminal CK of flip-flop 218. Moreover, as was described above, the delay between the signals received by the data and clock terminals of flip-flop 218 is representative of the width of the pulse and hence the droop in supply voltage $V_{DD}$.

Referring to FIG. 2, in accordance with one aspect of the present disclosure, the miller capacitance is used to control the capacitive loading at nodes F and G, thereby to vary the delay between the arrival times of the signals at the data and clock terminals of flip-flop 218. By varying the miller capacitance, and hence the delay between the arrival times of the data and clock signals of flip-flop 218, the difference between the arrival times of the clock and the data at flip-flop 218 may be changed. In accordance with one aspect of the present disclosure, the signals applied to nodes $EN_1$ and $EN_2$, shown as being connected to input terminals of NAND gates 206 and 216, are used to change the capacitive loading at nodes G and F respectively, as described further below.

Figure 3:
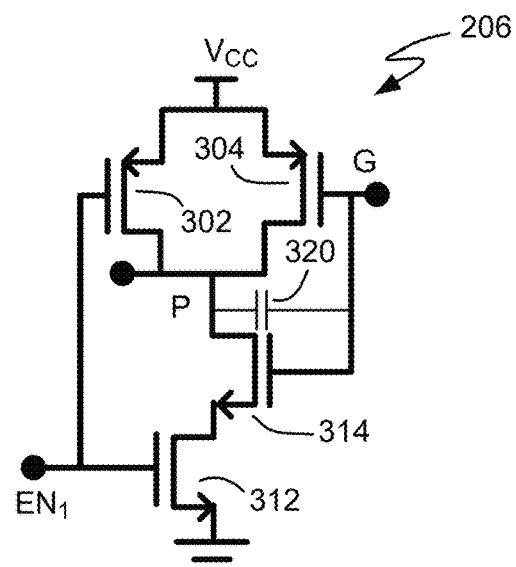
FIG. 3 is a schematic diagram of a NAND gate used in the supply voltage droop magnitude detector circuit of FIG. 1, in accordance with one exemplary embodiment of the present disclosure.

FIG. 3 is a transistor schematic diagram of NAND gate 206. Node $EN_1$ is connected to the gate terminals of PMOS transistor 302 and NMOS transistor 312, and node G is connected to the gate terminals of PMOS transistor 304 and NMOS transistor 314. Also shown is the Miller capacitance 320 disposed between input node G and output node P of the NAND gate. When the voltage applied to node $EN_1$ is at a low logic level (e.g., 0 volt), the miller capacitance has a value defined nearly by $2*C_{ox}$, where $C_{ox}$ is the gate oxide capacitance of any of the transistor of NAND gate 206. When the voltage applied to node $EN_1$ is at a high logic level (e.g., supply voltage $V_{DD}$), the miller capacitance has a value defined nearly by $[2*C_{ox}+(1+A)*C_{ox}]$, where A represents the gain of NAND gate 206.

Referring to FIGS. 2 and 3 concurrently, it is seen that by changing the signal applied to node $EN_1$, the capacitance at node $EN_1$, and therefore, the delay across inverter 202 may be changed. In a similar manner, by changing the signal applied to node $EN_2$, the capacitance at node $EN_2$, and therefore, the delay across inverter 212 may be changed. Therefore, in accordance with one aspect of the present disclosure, by changing the signal applied either to node $EN_1$ or to node $EN_2$ or to both nodes $EN_1$ and $EN_2$, the difference between the arrival times of the data and clock at flip-flop 218 may be changed to achieve the desired timing resolution.

Referring concurrently to FIGS. 1 and 2, the delay associated with different TDC units is adjusted during a calibration phase, using the miller capacitance, such that the difference between the arrival times of the clock and data signals at TDC unit $110_j$ is larger than the difference between the arrival times of the clock and data signals at TDC block $110_{j+1}$. In one embodiment, the difference between the arrival times of the clock and data signals at two consecutive TDC units, namely TDC units $110_j$ and $110_{j+1}$, is set to correspond to a minimum miller capacitance value achievable by the semiconductor processing technology that will be used to manufacture the IC. For example, if the smallest achievable difference between the capacitance loading at nodes F and G, using the miller effect, can cause a differential delay of 1.5 picoseconds (psec), then the difference between the arrival times of the clock and data signals at TDC unit $110_j$ is adjusted to be greater than the difference between the arrival times of the clock and data signals at TDC unit $110_{j+1}$ by 1.5 psec.

For example, assume that the delay differential between the arrival times of the data and clock signals at TDC unit $110_1$ when there is no droop in the supply voltage is 50 psec. Assume further that using the miller effect, the difference in the arrival times of the clock and data at each successive TDC unit may be made smaller by 1.5 psec. Accordingly, the difference in the arrival times of the clock and data is (i) 48.5 psec at TDC unit $110_2$, (ii) 47 psec at TDC unit 1103, (iii) 45.5 psec at TDC unit 1104, and the like.

To determine the droop magnitude, the droop detector 100 is calibrated during a calibration phase, using the miller capacitance as described above, so that when there is no $V_{DD}$ droop, the TDC units' outputs is '1' for bits 1 . . . . M, and '0' for the remaining bit M+1 . . . . N. For example, assuming M is 6 and the TDC has 10 bits, during the calibration the output bits of the TDC are as follows "1111110000".

Assume that during the operation, the pulse width due to the $V_{DD}$ droop is such that the arrival times of the data and clock signals at TDC units 1107, 1108 cause outputs $B_7$, and $B_8$, which were calibrated initially to be at logic 0, switch states to logic 1. Accordingly, the output of the TDC block 120 will be "1111111100". The change from the calibrated state of "1111110000" to the changed state of "1111111100" reflects shifts in two of the bits of the TDC block 120. Because each bit change corresponds to 1.5 psec, the $V_{DD}$ droop has caused a 3 psec shift, from which the $V_{DD}$ droop magnitude is determined.

Figure 4:
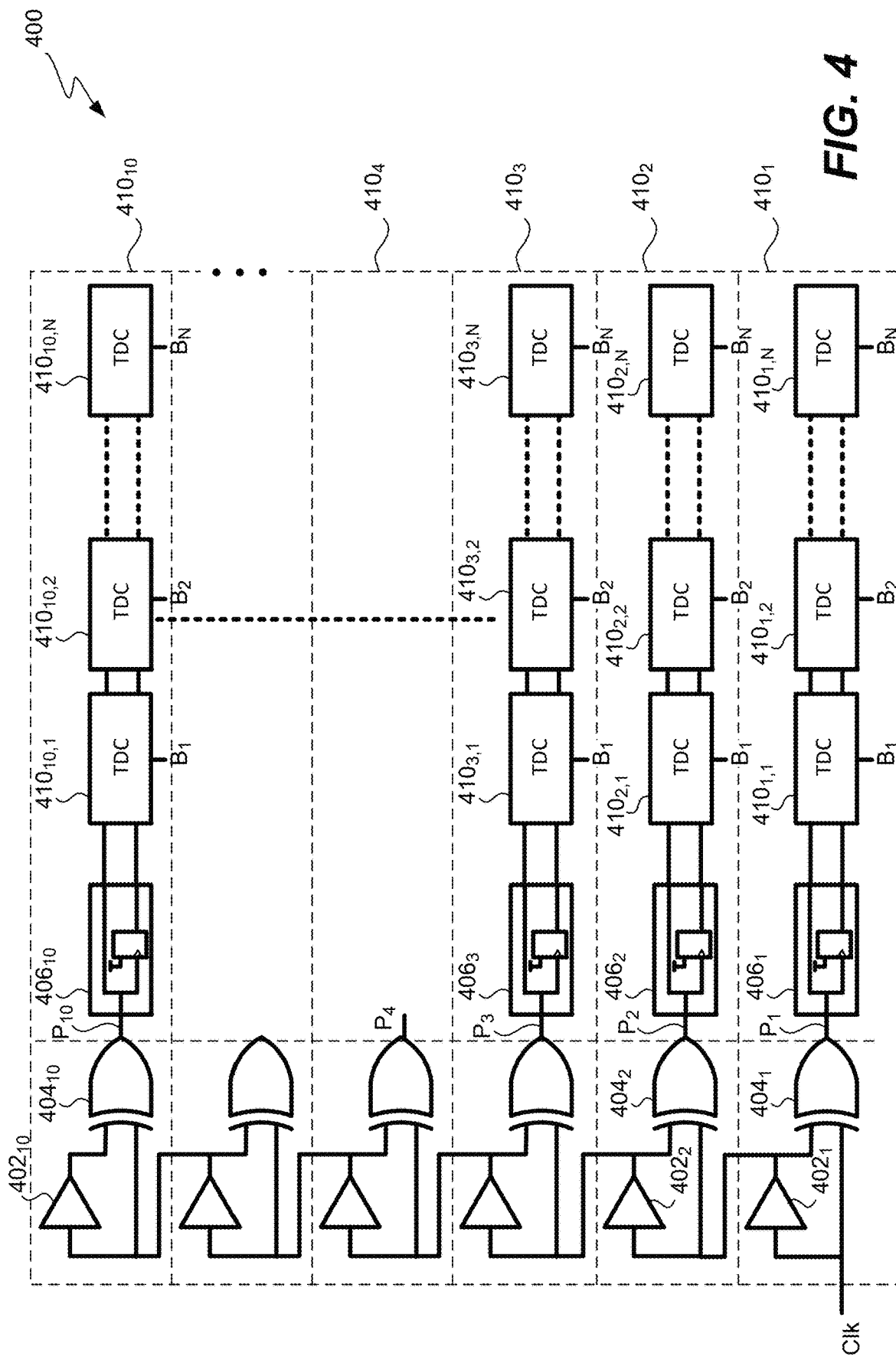
FIG. 4 is a schematic diagram of a supply voltage droop magnitude and duration detector circuit, in accordance with one exemplary embodiment of the present disclosure.

In accordance with another aspect of the present disclosure, in addition to the magnitude, the duration of the supply voltage droop is also determined. FIG. 4 is a schematic diagram of a droop magnitude and duration detector (hereinafter alternatively referred as droop detector) 400, in accordance with one embodiment of the present disclosure. Droop detector 400 is shown as including 10 TDC chains TDC $410_1$, $410_2$ . . . $410_{10}$ each of which corresponds to droop magnitude detector 100 shown in FIG. 1. For example, TDC chain $410_1$ is shown as including, in part, buffer $402_1$ and XOR gate $404_1$ together forming a phase generator, edge detector 4061, and N TDC units $410_{1,1}$, $410_{1,2} \ldots 410_{1,N}$; TDC chain $410_2$ is shown as including, in part, buffer $402_2$ and XOR gate $404_2$ together forming a phase generator, edge detector $406_2$, and N TDC units $410_{2,1}$, $410_{2,2} \ldots 410_{2,N}$; similarly, TDC chain $410_{10}$ is shown as including, in part, buffer $402_{10}$ and XOR gate $404_{10}$ together forming a phase generator, edge detector $406_{10}$, and N TDC units $410_{10,1}$, $410_{10,2} \ldots 410_{10,N}$. It is understood that a droop detector, in accordance with embodiments of the present disclosure, may have any number of TDC chains each of which may have any number of TDC units. The magnitude of the droop in the supply voltage may be determined from the TDC chains in the same manner as was described above with respect to droop magnitude detector 100.

To detect the duration of the droop, the TDC chains are calibrated such that the TDC units having similar bit position in different chains have the same capacitive loading and thus the same difference between the arrival times of their clock and data at their respective flip-flops. For example, TDC units $410_{1,1}$, $410_{2,1}$, $410_{3,1}$, $410_{4,1}$, $410_{5,1} \ldots 4101_{0,1}$ are capacitively loaded, via their respective miller capacitances, to have the same difference between the arrival times of their data and clock terminals at their respective flip-flops (e.g., flip-flop 218 shown in FIG. 2). Likewise, TDC bits $410_{1,N}$, $410_{2,N}$, $410_{3,N}$, $410_{4,N}$, $410_{5,N} \ldots 4101_{0,N}$ are capacitively loaded, via their respective miller capacitances, to have the same difference between the arrival times of their data and clock terminals at their respective flip-flops.

Figures 5A, 5B:
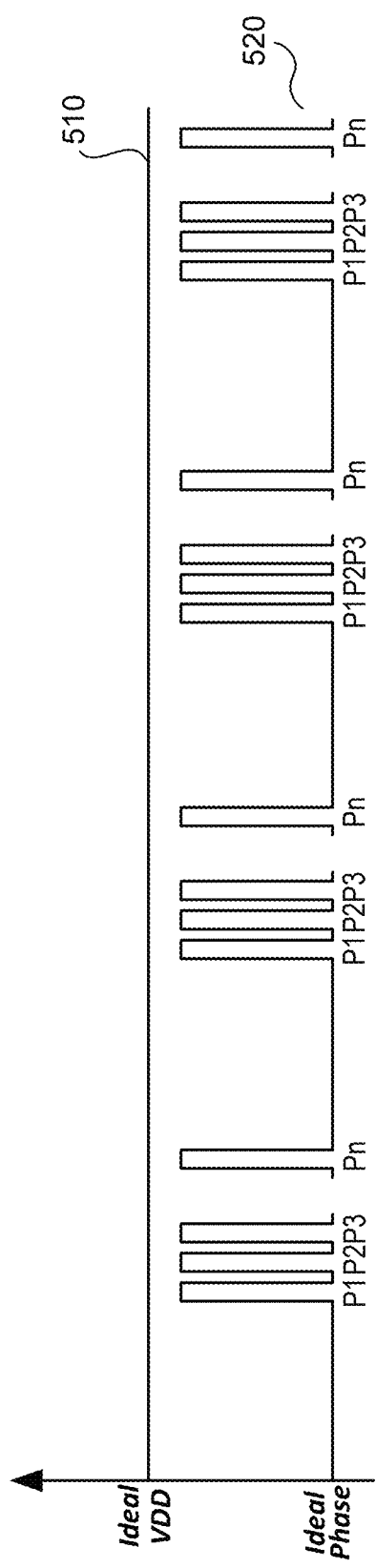
FIG. 5A shows multiple pulses generated by the droop magnitude and duration detector circuit of FIG. 4 when no supply voltage droop is detected, in accordance with one exemplary embodiment of the present disclosure.
FIG. 5B is a table showing various bits of the droop magnitude and duration detector circuit of FIG. 4 when no supply voltage droop is detected, in accordance with one exemplary embodiment of the present disclosure.

During the calibration phase, all TDC chains are calibrated to have the same bit pattern. For example, assuming N in FIG. 4 is 10, then all TDC chains may be calibrated to have the bit pattern "1111110000". FIG. 5A shows an ideal $V_{DD}$ with no droop, as well as pulses $P_1, P_2 \ldots P_{10}$ generated by the phase generators of droop detector 400. Because there is no droop in $V_{DD}$, all pulses $P_1, P_2 \ldots P_{10}$ of droop detector have the same width. Moreover, because there is no $V_{DD}$ droop, the outputs of the TDC units in each chain retain their calibrated values, as is shown in FIG. 5B.

Figure 6A:
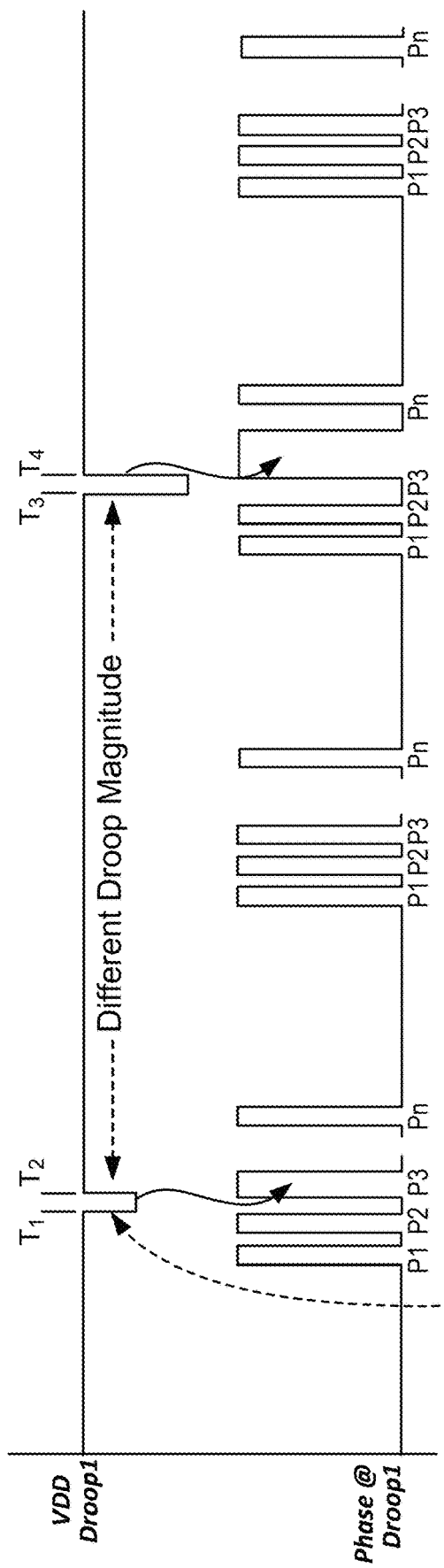
FIG. 6A shows multiple pulses generated by the droop magnitude and duration detector circuit of FIG. 4 in response to first and second droops in the supply voltage, in accordance with one exemplary embodiment of the present disclosure.

FIG. 6A shows $V_{DD}$ droops occurring during the time intervals $(T_2-T_1)$ and $(T_4-T_3)$. The magnitude of the droop is shown to be larger during the time interval $(T_4-T_3)$ than it is during the time interval $(T_2-T_1)$. Due to the timing of the droops in $V_{DD}$ as shown, the droop is detected by the phase generator disposed in TDC chain $410_3$. Accordingly, pulse $P_3$ is wider than the other pulse $P_1, P_2, P_4 \ldots P_{10}$. Moreover, pulse $P_3$ is wider during the interval $(T_4-T_3)$ than it is during the interval $(T_2-T_1)$.

The increase in the width of pulse $P_3$ during the interval $(T_2-T_1)$ causes a change in the bit pattern of TDC chain $410_3$ from "1111110000" to "1111111100", as shown in row 3 of FIG. 6B and pointed to by arrow 610. The bit pattern of the remaining TDC chains does not change, as is shown in FIG. 6B. Due to the larger droop in $V_{DD}$ during the interval $(T_4-T_3)$, the resulting increase in the width of pulse $P_3$ causes more of the bits in TDC chain $410_3$ to change states from "1111110000" to "1111111111", as shown in row 3 of FIG. 6C and pointed to by arrow 620.

Figure 7A:
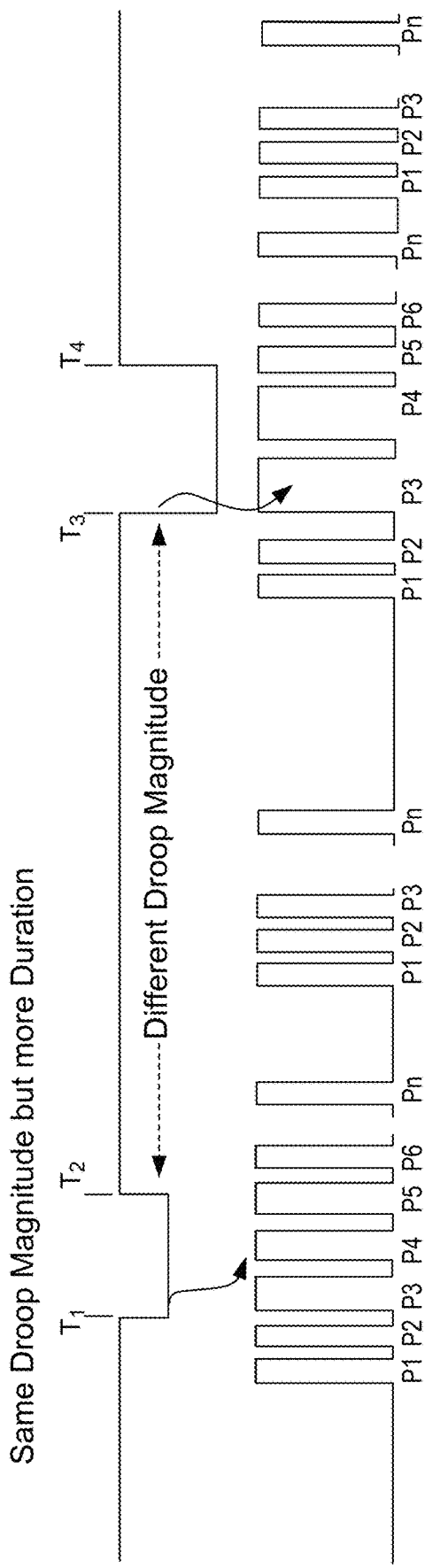
FIG. 7A shows multiple pulses generated by the droop magnitude and duration detector circuit of FIG. 4 in response to first and second droops in the supply voltage, in accordance with one exemplary embodiment of the present disclosure.

FIG. 7A shows $V_{DD}$ droops occurring during the time intervals $(T_2-T_1)$ and $(T_4-T_3)$. The magnitude of the droop is shown to be larger during the time interval $(T_4-T_3)$ than it is during the time interval $(T_2-T_1)$. Moreover, the widths of the droop in $V_{DD}$ are shown to be greater in FIG. 7A relative to those in FIG. 6A. Due to the timing of the droops in $V_{DD}$ as shown, the droop is detected by the phase generators disposed in TDC chains $410_3$, $410_4$ and $410_5$. Accordingly, pulses $P_3, P_4$ and $P_5$ are wider than the other pulse $P_1, P_2, P_6 \ldots P_{10}$. Moreover, due to the timings as shown, pulses $P_3$ and $P_4$ are wider during the interval $(T_4-T_3)$ than they are during the interval $(T_2-T_1)$.

The increase in the widths of pulses $P_3, P_4$ and $P_5$ during the interval $(T_2-T_1)$ causes changes in the bit patterns of TDC chain $410_3$, $410_4$ and $410_5$ from "1111110000" to "1111111100", as shown in rows 3, 4 and 5 of FIG. 7B and pointed to by arrows 710, 720 and 730. The bit pattern of the remaining TDC chains does not change. Due to the larger droop in $V_{DD}$ during the interval $(T_4-T_3)$, the resulting increase in the widths of pulses $P_3$ and $P_4$ causes more of the bits in TDC chain $410_3$ and $410_4$ to change states from "1111110000" to "1111111111", as shown in rows 3 and 4 of FIG. 7C and pointed to by arrows 740 and 750. Because pulse $P_5$ has the same width during both time intervals $(T_4-T_3)$ and $(T_2-T_1)$, the bit pattern of TDC chain $410_5$ remain at "1111111100", as shown in row 760 of FIG. 7C. Because the droop in $V_{DD}$ in this example is detected by three TDC chains $410_3$, $410_4$, $410_5$, the droop duration is determined to be 3*(period of the clock Clk)/(number of phase detectors of the droop detector).

Figure 8:
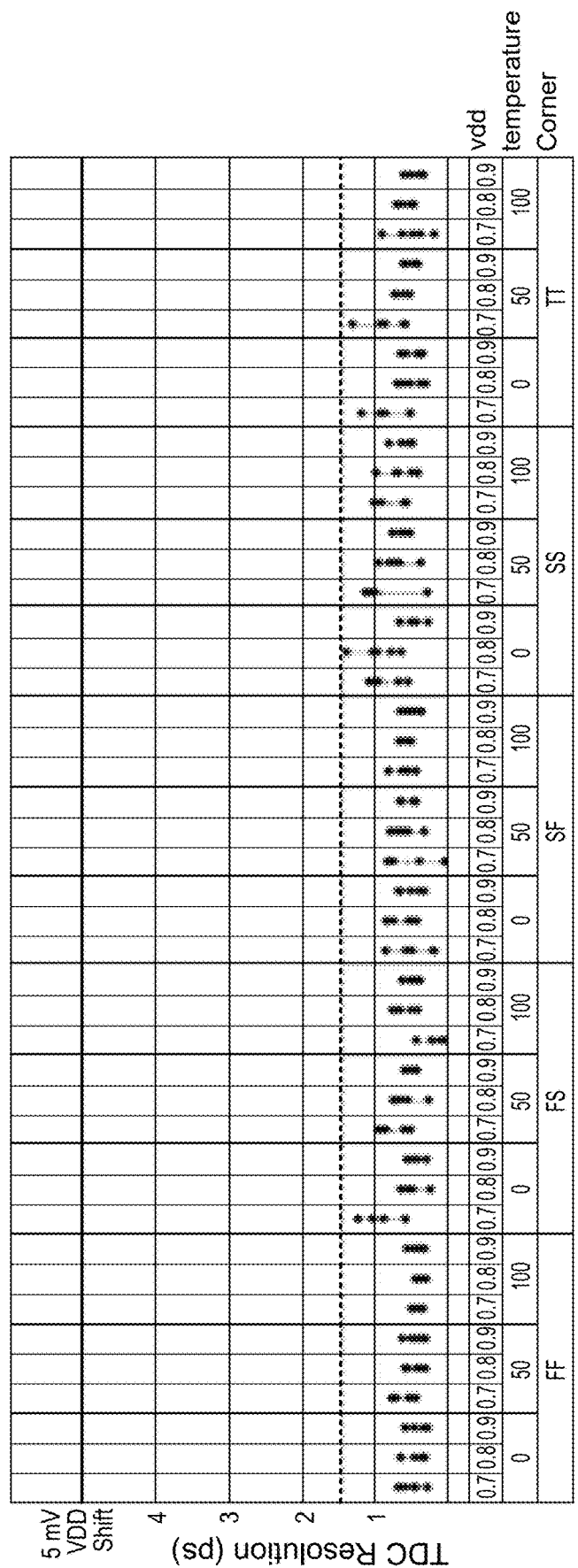
FIG. 8 shows the timing resolution achieved in detecting the droop magnitude under different supply voltages, temperatures and process conditions, in accordance with one exemplary embodiment of the present disclosure.

FIG. 8 shows computer simulations of the TDC resolution achieved in detecting the droop magnitude of 5 mv for 3 different supply voltages $V_{DD}$ of 0.7v, 0.8v, 0.9v; three different temperatures of 0° C., 50° C. and 100° C.; and different process corners of FF (fast NMOS, fast PMOS), FS (fast NMOS, slow PMOS), SF (slow NMOS, fast PMOS), SS (slow NMOS, slow PMOS), TT (typical NMOS, typical PMOS). As is seen from FIG. 8, the TDC resolution is at least 1.5 psec for all the above process, voltage and temperature (PVT) variations, in accordance with embodiments of the present disclosure.

Figure 9:
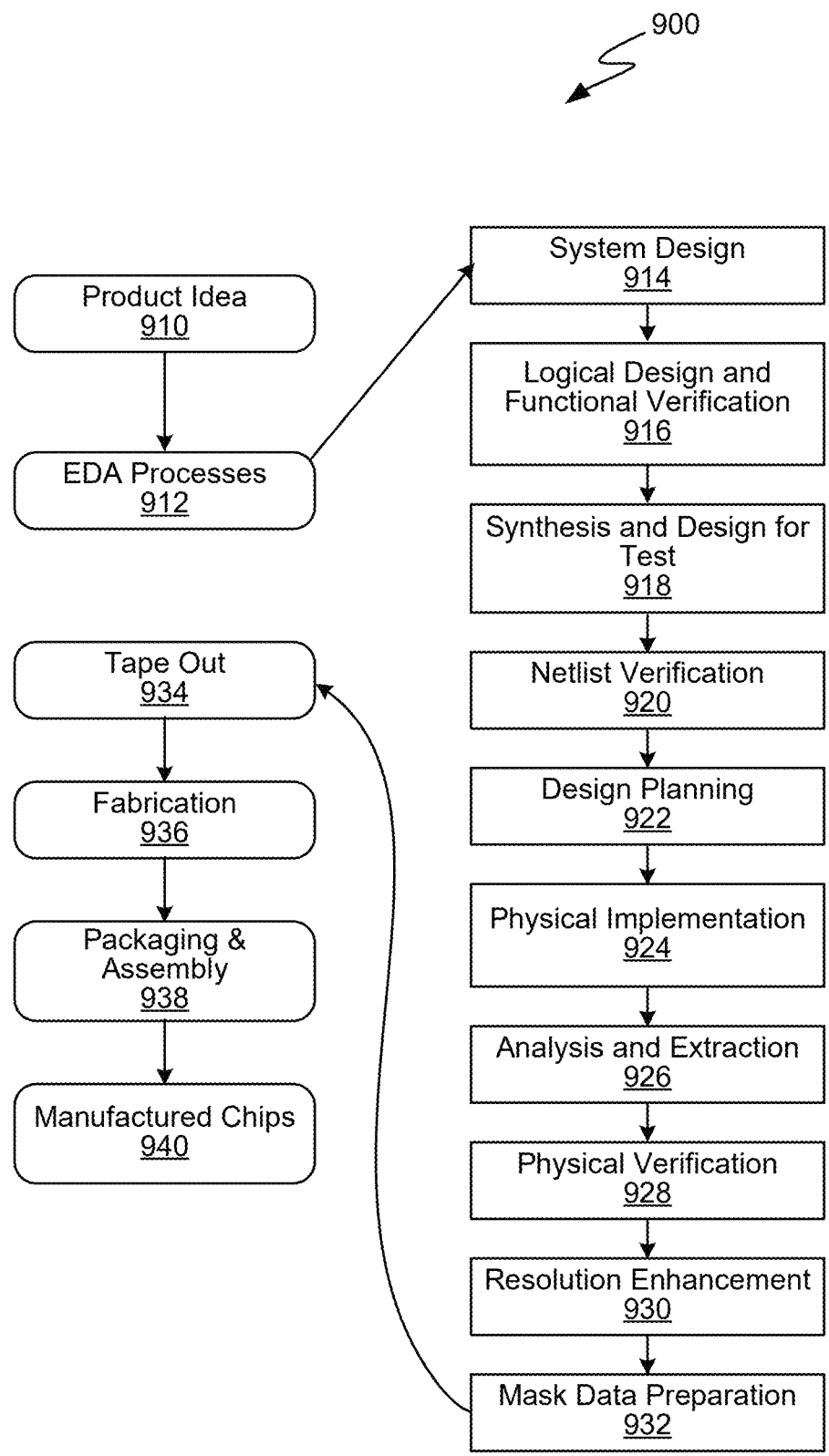
FIG. 9 depicts a flowchart of various processes used during the design and manufacture of an integrated circuit in accordance with some embodiments of the present disclosure.

FIG. 9 illustrates an example set of processes 900 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 910 with information supplied by a designer, information which is transformed to create an article of manufacture that uses a set of EDA processes 912. When the design is finalized, the design is taped-out 934, which is when artwork (e.g., geometric patterns) for the integrated circuit is sent to a fabrication facility to manufacture the mask set, which is then used to manufacture the integrated circuit. After tape-out, a semiconductor die is fabricated 936 and packaging and assembly processes 936 are performed to produce the finished integrated circuit 940.

Specifications for a circuit or electronic structure may range from low-level transistor material layouts to high-level description languages. A high-level description may be used to design circuits and systems, using a hardware description language ('HDL') such as VHDL, Verilog, System Verilog, SystemC, MyHDL or Open Vera. The HDL description can be transformed to a logic-level register transfer level ('RTL') description, a gate-level description, a layout-level description, or a mask-level description. Each lower level description adds more useful detail into the design description, for example, more details for the modules that include the description. The lower levels of description can be generated by a computer, derived from a design library, or created by another design automation process. An example of a specification language at a lower level language for specifying more detailed descriptions is SPICE, which is used for detailed descriptions of circuits with many analog components. Descriptions at each level is enabled for use by the corresponding tools of that layer (e.g., a formal verification tool). A design process may use a sequence depicted in FIG. 9. The processes described by be enabled by EDA products (or tools).

During system design 914, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 916, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 918, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 920, the netlist is checked for compliance with timing constraints and for correspondence with the HDL code. During design planning 922, an overall floor plan for the integrated circuit is constructed and analyzed for timing and top-level routing.

During layout or physical implementation 924, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 926, the circuit function is verified at the layout level, which permits refinement of the layout design. During physical verification 928, the layout design is checked to ensure that manufacturing constraints are correct, such as DRC constraints, electrical constraints, lithographic constraints, and that circuitry function matches the HDL design specification. During resolution enhancement 930, the geometry of the layout is transformed to improve how the circuit design is manufactured.

During tape-out, data is created to be used (after lithographic enhancements are applied if appropriate) for production of lithography masks. During mask data preparation 932, the 'tape-out' data is used to produce lithography masks that are used to produce finished integrated circuits.

A storage subsystem of a computer system (such as computer system 1100 of FIG. 8) may be used to store the programs and data structures that are used by some or all of the EDA products described herein, and products used for development of cells for the library and for physical and logical design that use the library.

Figure 10:
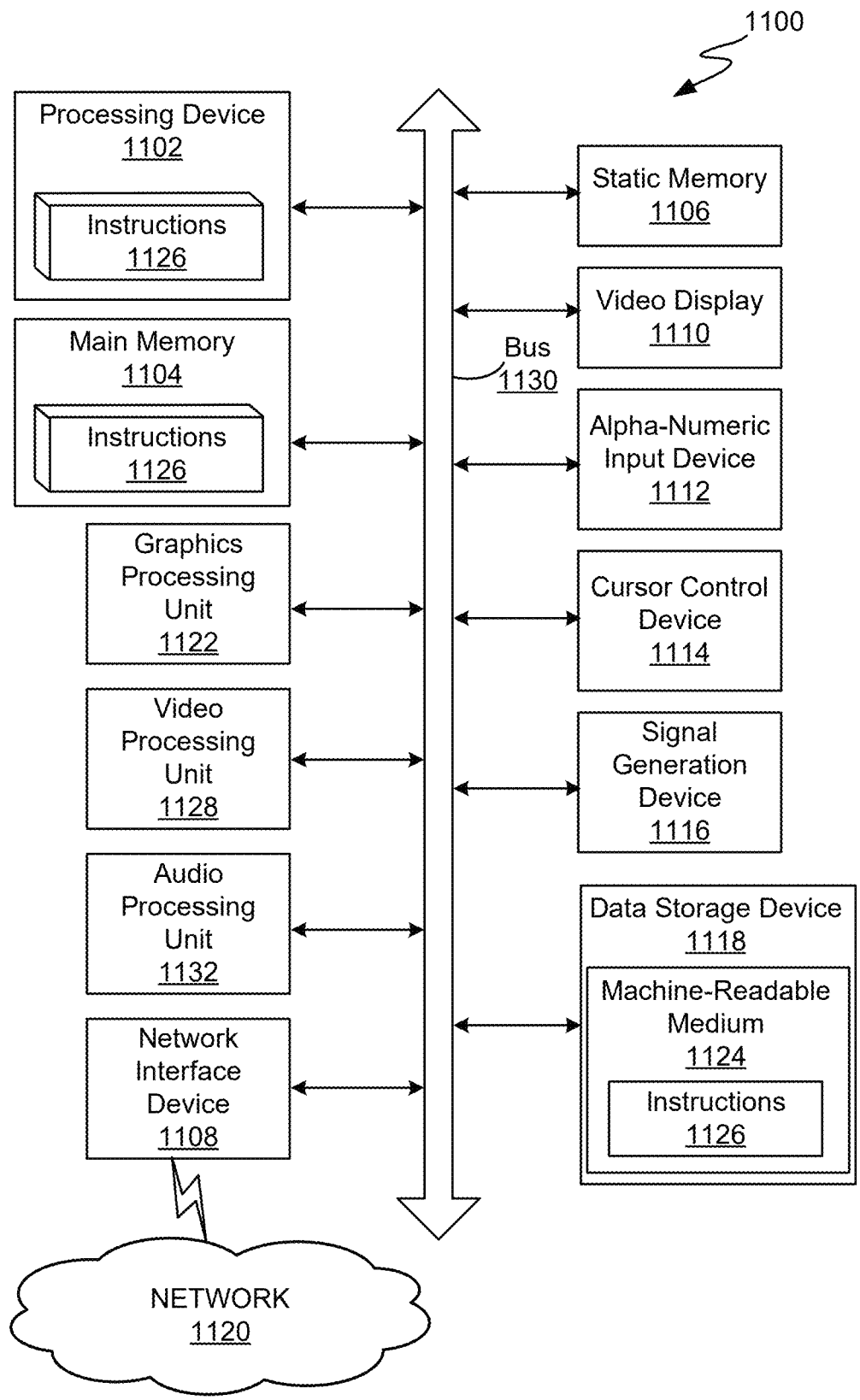
FIG. 10 depicts an example diagram of an example computer system in which embodiments of the present disclosure may operate.

FIG. 10 illustrates an example machine of a computer system 1100 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1100 includes a processing device $110_2$, a main memory 1104 (e.g., read-only memory (ROM), flash memory, dynamic random access memory (DRAM) such as synchronous DRAM (SDRAM), a static memory 1106 (e.g., flash memory, static random access memory (SRAM), etc.), and a data storage device 1118, which communicate with each other via a bus 1130.

Processing device 1102 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. The processing device 1102 may be configured to execute instructions 1126 for performing the operations and steps described herein.

The computer system 1100 may further include a network interface device 1108 to communicate over the network 1120. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), a graphics processing unit 1122, a signal generation device 1116 (e.g., a speaker), graphics processing unit 1122, video processing unit 1128, and audio processing unit 1132.

The data storage device 1118 may include a machine-readable storage medium 1124 (also known as a non-transitory computer-readable medium) on which is stored one or more sets of instructions 1126 or software embodying any one or more of the methodologies or functions described herein. The instructions 1126 may also reside, completely or at least partially, within the main memory 1104 and/or within the processing device 1102 during execution thereof by the computer system 1100, the main memory 1104 and the processing device 1102 also constituting machine-readable storage media.

In some implementations, the instructions 1126 include instructions to implement functionality corresponding to the present disclosure. While the machine-readable storage medium 1124 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1102 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

What is claimed:

1. A droop detector comprising:
a first phase generator adapted to generate a first pulse in response to a clock signal, the first pulse having a first edge and a second edge occurring after the first edge;
a first edge detector adapted to generate a first signal in response to the second edge of the first pulse, the first signal having a same direction as the first edge of the first pulse; and
a first N-bit time-to-digital converter comprising N time-to-digital converter units, the first N-bit time-to-digital converter adapted to generate an N-bit value representative of a timing difference between the first edge of the first pulse and the first signal, wherein each time-to-digital converter unit comprises a flip-flop, wherein a capacitance associated with at least a subset of the N time-to-digital converter units is adjusted during a calibration time so that a difference between arrival times of respective data and clock at the flip-flop disposed in $j^{th}$ time-to-digital converter unit is greater than a difference between arrival times of respective data and clock at the flip-flop disposed in $(j+1)^{th}$ time-to-digital convert unit, wherein j is an index ranging from 1 to N, and wherein N is an integer greater than one, wherein the data terminal of the flip-flop disposed in each time-to-digital converter unit is responsive to the first edge of the first pulse, and the clock terminal of the flip-flop disposed in each time-to-digital converter unit is responsive to the first signal.

2. The droop detector of claim 1 wherein the direction is the rising edge of the first pulse.

3. The droop detector of claim 2 wherein the first edge detector comprises a negative-edge triggered flip-flop.

4. The droop detector of claim 1 wherein each of the subset of the N time-to-digital converter units further comprises a first externally controllable logic gate disposed along a path of the data of the flip-flop disposed in the time-to-digital converter unit, and a second externally controllable logic gate disposed along a path of the clock of the flip-flop disposed in the time-to-digital converter unit.

5. The droop detector of claim 4 wherein the first and second externally controllable logic gates of each of the subset of the N time-to-digital converter units are controlled during the calibration time to change miller capacitances of the first and second externally controllable logic gates, and wherein during the calibration time, an output of each of M of the N flip-flops of the time to-digital converter units is set to a first logic level, and an output of each of (N−M) of the flip-flops of the time to-digital converter units is set to a second logic level.

6. The droop detector of claim 5 wherein the miller capacitances associated with the $j^{th}$ time-to-digital converter unit are caused to provide a same capacitive loading as the miller capacitances associated with the $(j+1)^{th}$ time-to-digital converter unit.

7. The droop detector of claim 6 wherein the first phase generator comprises:
   a first inverter receiving the clock signal; and
   a first XOR gate having a first terminal receiving the clock signal, and a second input terminal receiving an output of the first inverter.

8. The droop detector of claim 6 wherein in response to a droop in a supply voltage, the outputs of a subset of the (N−M) flip-flops change states representative of a magnitude of the droop.

9. The droop detector of claim 5 wherein the first and second externally controllable logic gates of each of the subset of the N time-to-digital converter units are NAND gates.

10. The droop detector of claim 1 further comprising:
   K phase generators each receiving a different delayed replica of the clock signal, and generating an associated pulse in response, the pulse generated by each of the K phase generators having a third edge that has the same direction as the first edge of the first pulse, and a fourth edge occurring after the third edge, wherein K is an integer greater than 1;
   K edge detectors, each associated with a different one of the K phase generators and each adapted to generate a third signal in response to the fourth edge of the pulse generated by the associated phase generator, wherein the third signal of each of the K edge detectors has a same direction as the first edge of the first pulse; and
   K N-bit time-to-digital converters each associated with a different one of the K phase generators and a different one of the K edge detectors, each of the K time-to-digital converters comprising N time-to-digital converter units, each of the K time-to-digital converters adapted to generate an N-bit value representative of a timing difference between the associated third edge of the pulse and the associated third signal, wherein each time-to-digital converter unit of each of the K time-to-digital converters comprises a flip-flop, wherein a capacitance associated with at least a subset of the time-to-digital convert units of each of the K time-to-digital converters is adjusted during a calibration time so that a difference between arrival times of data and clock at the flip-flop disposed in $j^{th}$ time-to-digital converter unit of each of the K time-to-digital converters is greater than a difference between arrival times of data and the clock at the flip-flop disposed in $(j+1)^{th}$ time-to-digital convert unit of each of the K time-to-digital converters, wherein the data terminal of the flip-flop disposed in each time-to-digital converter unit of each K time-to-digital converters is responsive to the associated third edge of the first pulse, and the clock terminal of the flip-flop disposed in each time-to-digital converter unit of each K time-to-digital converters is responsive to the associated third signal.

11. The droop detector of claim 10 wherein each of the subset of the time-to-digital converter units of each K time-to-digital converters further comprises a first externally controllable logic gate disposed along a path of the data of the flip-flop disposed in the time-to-digital converter unit, and a second externally controllable logic gate disposed along a path of the clock of the flip-flop disposed in the time-to-digital converter unit.

12. The droop detector of claim 11 wherein the first and second externally controllable logic gates of each of the subset of the time-to-digital converter units of each K time-to-digital converters are controlled during the calibration time to change miller capacitances of the first and second externally controllable logic gates, wherein an output of each of M of the N flip-flops of each of the K time-to-digital converters is set to a first logic level, and an output of each of the (N−M) of the flip-flops of the K time-to-digital converters is set to a second logic level.

13. The droop detector of claim 12 wherein in response to duration of a droop in the supply voltage, the output of each of a subset of (N−M) flip-flops in at least one the K time-to-digital converters of changes state representative of the duration of the droop.

14. A method of detecting droop in a supply voltage, the method comprising:
   generating a first pulse in response to a clock signal, the first pulse having a first edge and a second edge occurring after the first edge;
   generating a first signal in response to the second edge of the first pulse, the first signal having a same direction as the first edge of the first pulse; and
   generating an N-bit value representative of a timing difference between the first edge of the first pulse and the first signal by an N-bit time-to-digital converter comprising N time-to-digital converter units, wherein each time-to-digital converter unit comprises a flip-flop, wherein a capacitance associated with at least a subset of the N time-to-digital converter units is adjusted during a calibration time so that a difference between arrival times of data and clock at the flip-flop disposed in $j^{th}$ time-to-digital converter unit is greater than a difference between arrival times of data and clock at the flip-flop disposed in $(j+1)^{th}$ time-to-digital convert unit, wherein j is an index ranging from 1 to N, and wherein N is an integer greater than one, wherein the data terminal of the flip-flop disposed in each time-to-digital converter unit is responsive to the first edge of the first pulse, and the clock terminal of the flip-flop disposed in each time-to-digital converter unit is responsive to the first signal.

15. The method of claim 14 wherein each of the subset of the N time-to-digital converter units further comprises a first externally controllable logic gate disposed along a path of the data of the flip-flop disposed in the time-to-digital converter unit, and a second externally controllable logic gate disposed along a path of the clock of the flip-flop disposed in the time-to-digital converter unit.

16. The method of claim 15 wherein the first and second externally controllable logic gates of each of the subset of the N time-to-digital converter units are controlled during the calibration time to change miller capacitances of the first and second externally controllable logic gates, and wherein during the calibration time, an output of each of M of the N flip-flops of the time to-digital converter is set to a first logic level, and an output of each of (N−M) of the flip-flops of the time to-digital converter is set to a second logic level.

17. The method of claim 15 wherein the miller capacitances associated with the $j^{th}$ time-to-digital converter unit are caused to provide a same capacitive loading as the miller capacitances associated with the $(j+1)^{th}$ time-to-digital converter unit.

18. The method of claim 17 further comprising:
detecting a droop in a supply voltage by identifying changes in the outputs of at least a subset of the (N−M) flip-flops.

19. The method of claim 18 further comprising:
receiving, by each of K phase generators, a different delayed replica of the clock signal, and generating an associated pulse in response, the pulse generated by each of the K phase generators having a third edge that has the same direction as the first edge of the first pulse, and a fourth edge occurring after the third edge, wherein K is an integer greater than 1;
generating, by each of K edge detectors each associated with a different one of the K phase generators, a third signal in response to the fourth edge of the pulse generated by the associated phase generator, wherein the third signal of each of K edge detector has a same direction as the first edge of the first pulse; and
generating, by each of K N-bit time-to-digital converters each associated with a different one of the K phase generators and a different one of the K edge detectors, an N-bit value representative of a timing difference between the associated third edge of the pulse and the associated third signal, each of the K time-to-digital converters comprising N time-to-digital converter units, wherein each time-digital converter unit of each of the K time-to-digital converters comprises a flip-flop, wherein a capacitance associated with at least a subset of the N time-to-digital convert units of each of the K time-to-digital converters is adjusted during a calibration time so that a difference between arrival times of data and clock at the flip-flop disposed in $j^{th}$ time-to-digital converter unit of each of the K time-to-digital converters is greater than a difference between arrival times of data and the clock at the flip-flop disposed in $(j+1)^{th}$ time-to-digital convert unit of each of the K time-to-digital converters, wherein the data terminal of the flip-flops disposed in each time-to-digital converter unit of each K time-to-digital converters is responsive to the associated third edge of the first pulse, and the clock terminal of the flip-flop disposed in each time-to-digital converter unit of each K time-to-digital converters is responsive to the associated third signal.

20. A non-transitory computer readable medium comprising stored instructions, which when executed by a processor, cause the one or more processors to generate data representative of a droop detector, the droop detector comprising:
a first phase generator adapted to generate a first pulse in response to a clock signal, the first pulse having a first edge and a second edge occurring after the first edge;
a first edge detector adapted to generate a first signal in response to the second edge of the first pulse, the first signal having a same direction as the first edge of the first pulse; and
a first N-bit time-to-digital converter comprising N time-to-digital converter units, the first N-bit time-to-digital converter adapted to generate an N-bit value representative of a timing difference between the first edge of the first pulse and the first signal, wherein each time-digital converter unit comprises a flip-flop, wherein a capacitance associated with at least a subset of the time-to-digital converter units is adjusted during a calibration time so that a difference between arrival times of data and clock at the flip-flop disposed in $j^{th}$ time-to-digital converter unit is greater than a difference between arrival times of data and clock at the flip-flop disposed in $(j+1)^{th}$ time-to-digital convert unit, wherein j is an index ranging from 1 to N, and wherein N is an integer greater than one, wherein the data terminal of the flip-flop disposed in each time-to-digital converter unit is responsive to the first edge of the first pulse, and the clock terminal of the flip-flop disposed in each time-to-digital converter unit is responsive to the first signal.

* * * * *